(12) United States Patent
Wang

(10) Patent No.: US 12,338,806 B2
(45) Date of Patent: Jun. 24, 2025

(54) EASY-TO-ASSEMBLE FLOOR PUMP

(71) Applicant: BETO ENGINEERING & MARKETING CO., LTD., Taichung (TW)

(72) Inventor: Lopin Wang, Taichung (TW)

(73) Assignee: BETO ENGINEERING & MARKETING CO., LTD., Taichung (TW)

( * ) Notice: Subject to any disclaimer, the term of this patent is extended or adjusted under 35 U.S.C. 154(b) by 78 days.

(21) Appl. No.: 18/316,767

(22) Filed: May 12, 2023

(65) Prior Publication Data

US 2023/0417232 A1 Dec. 28, 2023

(30) Foreign Application Priority Data

Jun. 23, 2022 (TW) .................................. 111123502

(51) Int. Cl.
*F04B 33/00* (2006.01)
*F04B 9/14* (2006.01)
*G01L 17/00* (2006.01)

(52) U.S. Cl.
CPC .............. *F04B 33/005* (2013.01); *F04B 9/14* (2013.01); *F04B 33/00* (2013.01); *G01L 17/00* (2013.01)

(58) Field of Classification Search
CPC .......... F04B 9/14; F04B 33/00; F04B 33/005; G01L 17/00
See application file for complete search history.

(56) References Cited

U.S. PATENT DOCUMENTS

| 6,739,842 | B2* | 5/2004 | Wu ........................ | F04B 33/005 417/63 |
| 7,331,768 | B2* | 2/2008 | Wu ........................ | F04B 33/005 417/469 |
| 9,239,046 | B2* | 1/2016 | Wang .................... | F04B 33/005 |
| 9,945,367 | B2* | 4/2018 | Wang .................... | F04B 33/005 |
| 10,502,205 | B2* | 12/2019 | Wang ..................... | F04B 37/12 |
| 10,563,643 | B2* | 2/2020 | Wang .................... | F04B 39/123 |
| 2021/0239228 | A1* | 8/2021 | Wang ..................... | G01L 19/16 |

FOREIGN PATENT DOCUMENTS

TW I620870 B 4/2018

* cited by examiner

*Primary Examiner* — Peter J Bertheaud
(74) *Attorney, Agent, or Firm* — Guice Patents PLLC

(57) ABSTRACT

An easy-to-assemble floor pump comprises a base, a cylinder unit, and a pressure gauge. The cylinder unit is installed on the base and has a cylinder body, a through hole, a non-return seat, and a piston, the cylinder body has a first flow channel, the pressure gauge is installed at a second end of the cylinder body, the pressure gauge has a head part, a manifold part with a second flow channel formed inside, and an air outlet part disposed on the manifold part and forming a third flow channel inside; reciprocating movement of the piston causes air in the cylinder body to be capable of entering into the second flow channel and the third flow channel respectively through the first flow channel. Structural configuration of the floor pump is capable of reducing parts assembly procedures and easily replacing damaged parts.

18 Claims, 20 Drawing Sheets

EASY-TO-ASSEMBLE FLOOR PUMP

FIELD OF THE INVENTION

The invention relates to an inflator, and more particularly to an easy-to-assemble floor pump.

DESCRIPTION OF THE RELATED ART

An existing floor pump (Taiwan Patent No. 1620870) comprises a base, a cylinder connected to the base, a first connector disposed in the cylinder, a pressure gauge disposed on the base, an air tube connected to the base, a ventilation device passing through the base, the cylinder and the first connector and connected to the pressure gauge, and a second connector disposed between the base and the air tube.

The base comprises a first through hole, a first assembly part, a second assembly part, and a third assembly part located between the first assembly part and the second assembly part. The second connector is disposed on the third assembly part, the ventilation device is inserted into the first through hole, and passes through the first connector and the second connector to screw with the pressure gauge.

Although the above-mentioned prior art can achieve an object of use, since the pressure gauge, the second connector and the ventilation device are independent components, when assembling, an operator must first assemble the pressure gauge on the second assembly part of the base, assemble the second connector on the third assembly part of the base, and then passing the ventilation device through the first through hole in the base, the first connector and the second connector to screw with the pressure gauge, the components as a whole are complicated, and the whole body needs to be turned over and over again in an assembly process for combination and assembly, and therefore the procedures are complicated.

Furthermore, since the pressure gauge is assembled together with additional parts such as the base and the ventilation device, when the pressure gauge is damaged and needs to be replaced, in addition to being unable to simply replace the pressure gauge module, the operator must first turn the whole body over and over again, disassemble and combine all the parts fixed on the base, and therefore, the disassembly and assembly procedures are more complicated.

SUMMARY OF THE INVENTION

An object of the invention is to provide an easy-to-assemble floor pump capable of solving the above-mentioned drawbacks.

The easy-to-assemble floor pump of the invention comprises a base, a cylinder unit and a pressure gauge;
 the cylinder unit is installed on the base in a hollow tubular shape along a first axis, the cylinder unit has a cylinder body, the cylinder body has a first end and a second end, and forms a first flow channel inside; a through hole formed along a second axis and penetrating through the second end of the cylinder body; a non-return seat disposed at the second end of the cylinder body, the non-return seat has a perforation, the perforation communicates with the through hole; and a piston installed in the cylinder body and capable of reciprocating;
 the pressure gauge is installed at the second end of the cylinder body along the second axis, the pressure gauge has a head part, a manifold part with a second flow channel formed inside, and an air outlet part disposed on the manifold part and forming a third flow channel inside; reciprocating movement of the piston causes air in the cylinder body to be capable of entering into the second flow channel and the third flow channel respectively through the first flow channel.

An efficacy of the invention lies in: the pressure gauge can be quickly assembled by installing the pressure gauge at the second end of the cylinder body along the second axis, the uncomplicated components as a whole can simplify assembly procedures and make replacement of damaged parts easy.

BRIEF DESCRIPTION OF DRAWINGS

Other features and efficacies of the invention will be clearly presented in an implementation manner with reference to the drawings, in which.

DETAILED DESCRIPTION OF THE INVENTION

Figure 1:
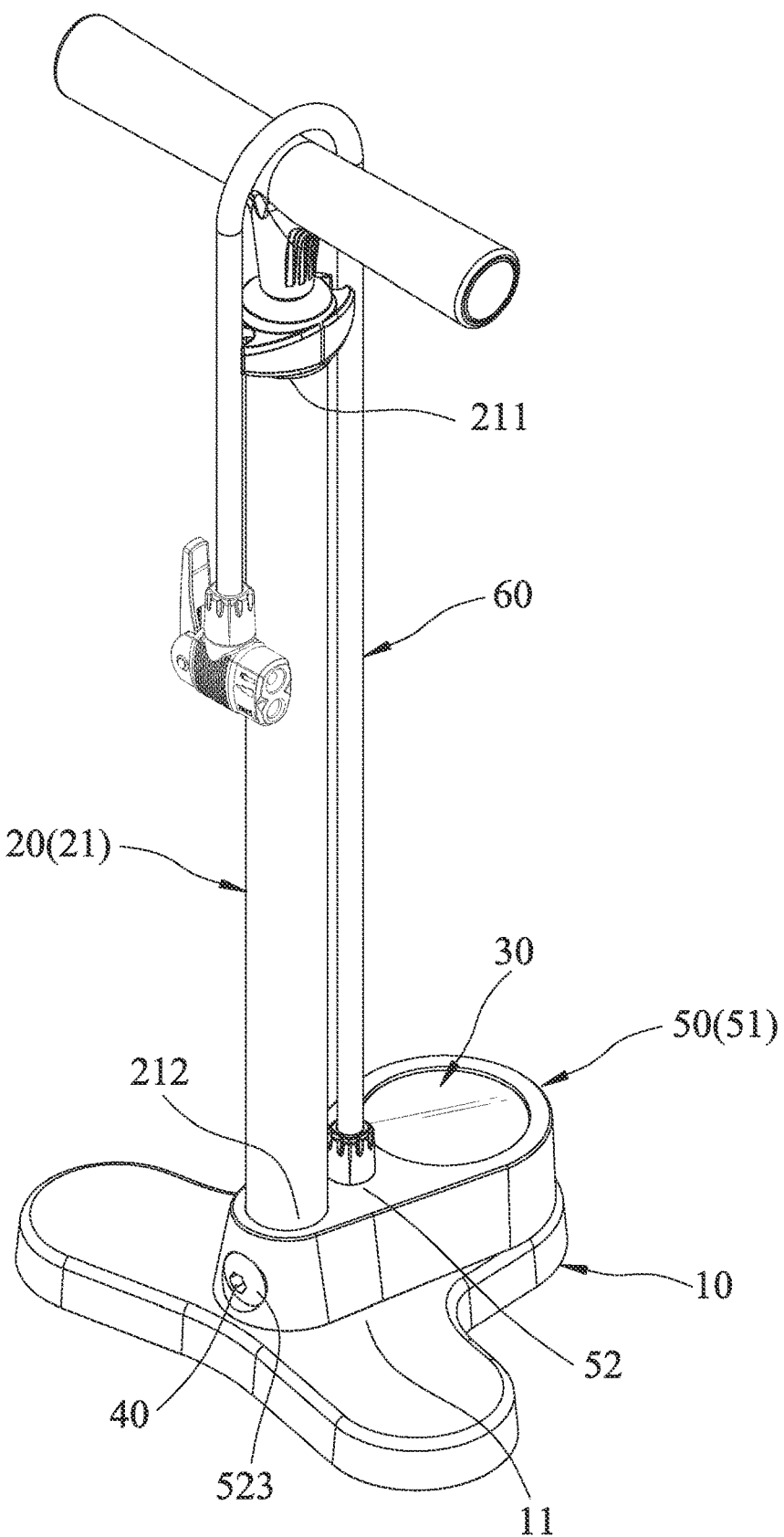
FIG. 1 is a perspective view of a first embodiment of an easy-to-assemble floor pump of the invention.

Before the invention is described in detail, it should be noted that in the following description, similar components are denoted by the same numerals.

Please refer to FIG. 1 to FIG. 4, a first embodiment of an easy-to-assemble floor pump of the invention comprises a base 10, a cylinder unit 20, a pressure gauge 30, a non-return valve cover 40, a pressure gauge cover 50, and an air guide unit 60.

The base 10 comprises a top surface 11.

The cylinder unit 20 extends upward from the top surface 11 along a first axis L1 that substantially perpendicularly intersects the top surface 11. The cylinder unit 20 has a cylinder body 21, a through hole 22, a non-return seat 23, and a piston 24. The cylinder body 21 in this embodiment is in a hollow tubular shape and connected to the base 10 as a whole, and has a first end 211 away from the top surface 11, and a second end 212 opposite to the first end 211 along the first axis L1. The second end 212 is connected with the base 10 as a whole. Inside the cylinder body 21 is formed with a first flow channel 213 extending from the first end 211 to reach the second end 212. The through hole 22 is formed along a second axis L2 perpendicular to the first axis L1 and penetrates through the second end 212 of the cylinder body 21. The non-return seat 23 of this embodiment can be detachably installed inside the second end 212 of the cylinder body 21 (that is, a bottom of the first flow channel 213). The non-return seat 23 has a perforation 231 and an air guide hole 232 communicating with the perforation 231 and the first flow channel 213, the perforation 231 and the through hole 22 communicate with each other coaxially, and the through hole 22 and the perforation 231 are located outside the base 10. The piston 24 is installed in the first flow channel 213 of the cylinder body 21 and capable of reciprocating along the first axis L1.

The pressure gauge 30 is installed at the second end 212 of the cylinder body 21 along the second axis L2. The pressure gauge 30 is exposed on the base 10 and is not installed in the base 10. The pressure gauge 30 has a head part 31, a manifold part 32, an air outlet part 33, and a gauge needle 34 installed inside the head part 31, the head part 31, the manifold part 32 and the air outlet part 33 are integrally formed. A second flow channel 321 is formed inside the manifold part 32, the second flow channel 321 is parallel to the second axis L2 and has a stepped hole shape, and has a large hole section 322 and a small hole section 323 communicated to the head part 31. The manifold part 32 is in the shape of a step tube on an outer peripheral surface and has a large diameter portion 324 and a small diameter portion 325, the large and small diameter portions 324, 325 are a front section and a rear section of the manifold part 32 respectively, and the front section (the large diameter portion 324) is connected to the head part 31. The rear section (the small diameter portion 325) has a second vent hole 326 communicating with the second flow channel 321, and the rear section (the small diameter portion 325) passes through the through hole 22 and the perforation 231. The air outlet part 33 is disposed on an outer peripheral surface of the front section (the large diameter portion 324) of the manifold part 32, and forms a third flow channel 331 internally and communicating with the second flow channel 321, and the third flow channel 331 is L-shaped and vertical.

The non-return valve cover 40 is screwed and locked with one end of the manifold part 32 of the pressure gauge 30, and is closed at an open end of the large hole section 322 of the second flow channel 321. The non-return valve cover 40 has a first vent hole 41, a diversion channel 42, and a ball 43, the first vent hole 41 and the second vent hole 326 are located on an axis, and the diversion channel 42 communicates with the third flow channel 331 and the small hole section 323. The ball 43 is movably disposed on the diversion channel 42 and capable of closing the diversion channel 42 under back pressure. In this embodiment, after the non-return valve cover 40 is screwed to the manifold part 32, one end of the diversion channel 42 communicates with the second flow channel 321 and the third flow channel 331 at the same time.

The pressure gauge cover 50 has a main cover part 51 and an extension part 52. The main cover part 51 is sleeved on the head part 31 of the pressure gauge 30 and has a display hole 511. The extension part 52 extends from the main cover part 51 and has a first sleeve hole 521, a second sleeve hole 522, and a third sleeve hole 523. The first sleeve hole 521 enables the air outlet part 33 to protrude; the second sleeve hole 522 enables the cylinder body 21 to protrude; and the third sleeve hole 523 enables the non-return valve cover 40 to protrude.

The air guide unit 60 has a joint 61 locked to the air outlet part 33.

In order to further understand functions produced by cooperation of the various components, technical means used, and expected efficacies of the invention, description will be provided hereinafter, and it is believed that a deeper and specific understanding of the invention can be obtained.

Figure 2:
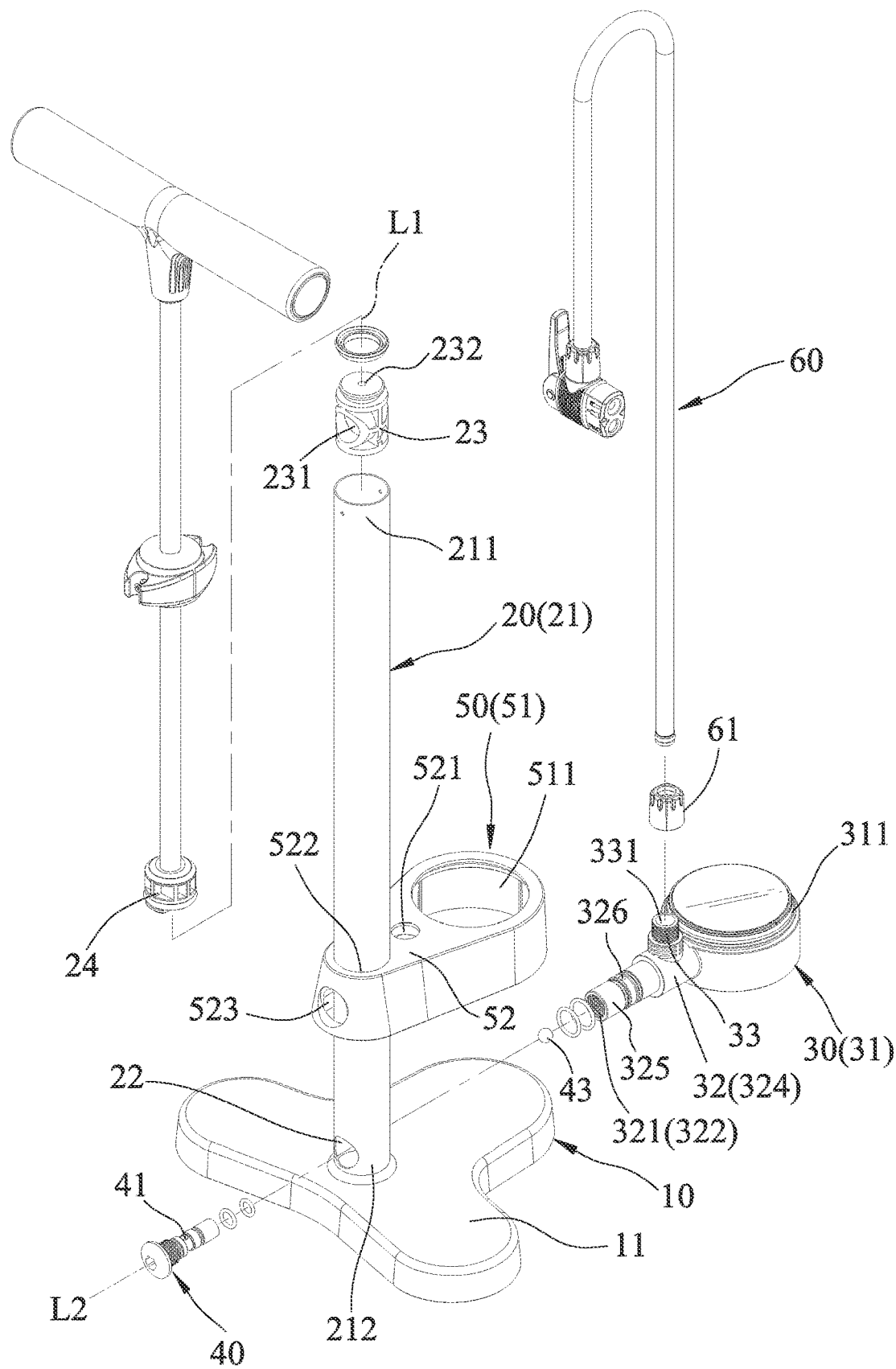
FIG. 2 is a perspective exploded view of the first embodiment.

As shown in FIG. 2, when assembling, an operator inserts the manifold part 32 of the pressure gauge 30 into the through hole 22 and the perforation 231 along the second axis L2 under a condition that the base 10 is in a normal orientation (that is, the top surface 11 faces upward), and then connects the manifold part 32 to the non-return valve cover 40 by screwing to complete assembly. It is not required to turn the base 10 over and over again during an assembly process to reduce assembly procedures. Then the pressure gauge cover 50 is sleeved on the head part 31, at the same time, the first sleeve hole 521 is sleeved on the air outlet part 33, and the second sleeve hole 522 is sleeved on the cylinder body 21. Then the non-return valve cover 40 is inserted into the third sleeve hole 523 and screwed and locked to the large hole section 322. Finally, the joint 61 of the air guide unit 60 is locked to the air outlet part 33.

Figure 3:
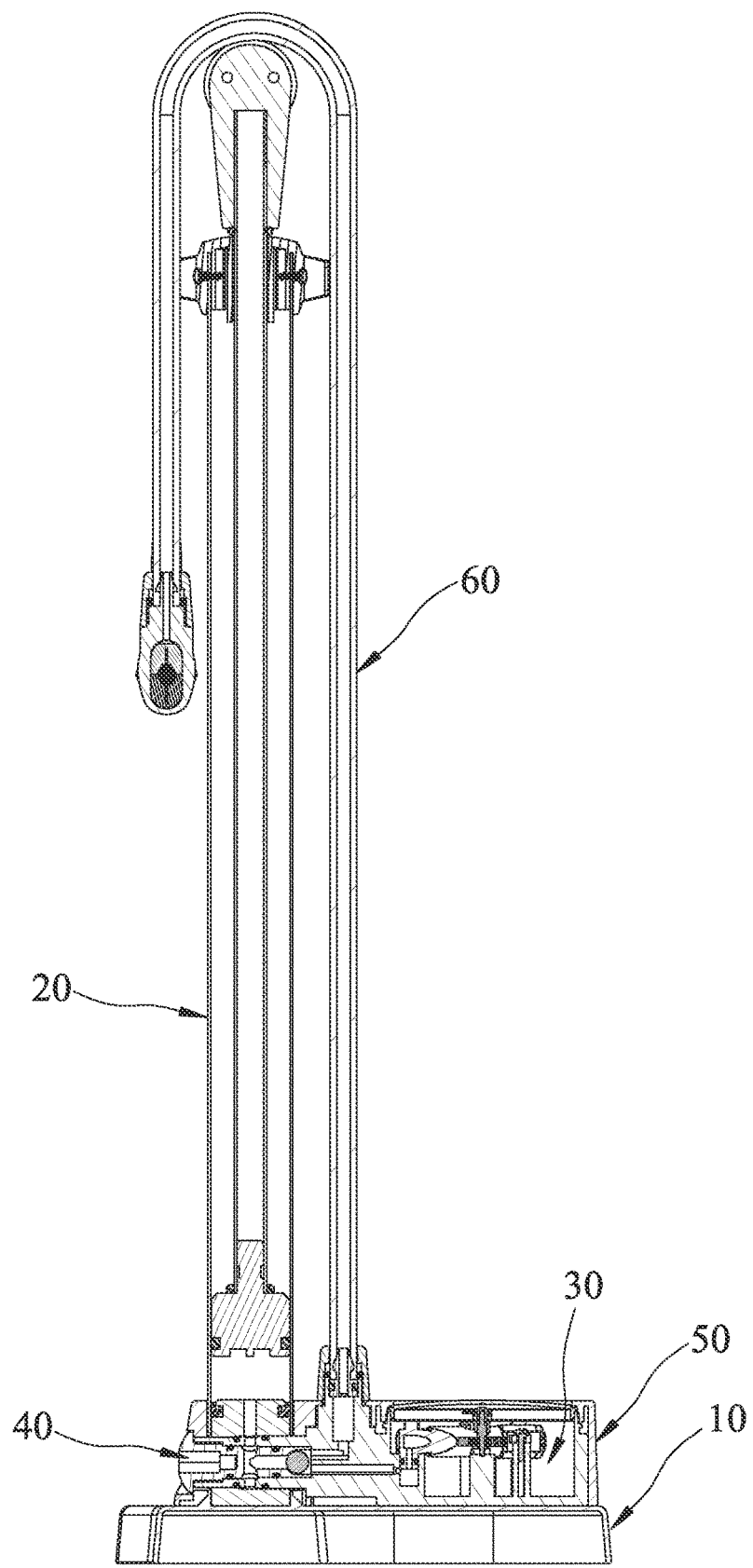
FIG. 3 is a cross-sectional view of the first embodiment.
Figure 4:
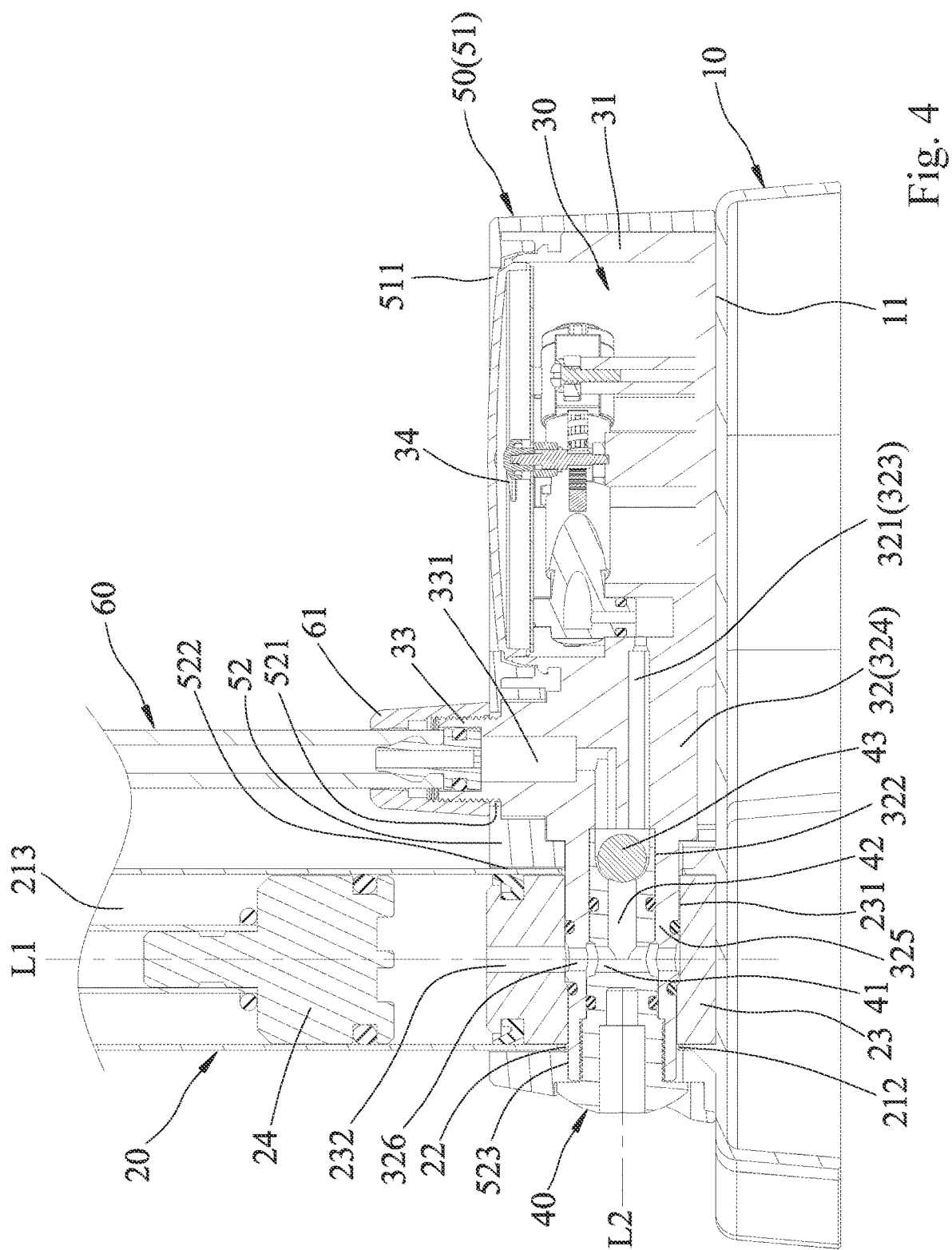
FIG. 4 is a partially enlarged view of FIG. 3.

As shown in FIG. 1, FIG. 3 and FIG. 4, after assembly of the components as a whole is completed, the operator manipulates the piston 24 to reciprocate upward and downward along the first axis L1, reciprocating movement of the piston 24 causes air in the cylinder body 21 to be capable of entering into the second flow channel 321 and the third flow channel 523 respectively through the first flow channel 213 to inflate an object to be inflated (not shown in the figures), and the gauge needle 34 displays an air pressure of the object to be inflated.

Disposition of the pressure gauge cover 50 in the invention has the following efficacies:

1. For positioning the cylinder body 21, the non-return valve cover 40, the manifold part 32, and the air outlet part 33, thereby capable of preventing the pressure gauge 30 from ejecting and detaching by the air pressure when the piston 24 is reciprocating to output air pressure.
2. The joint 61 of the air guide unit 60 and a hose connected to the joint 61 can not be shaken easily.
3. When the cylinder body 21 of the cylinder unit 20 is connected to the base 10 as a whole by welding, the pressure gauge cover 50 can be used to cover welding burn marks between the cylinder body 21 and the base 10.

Figure 5:
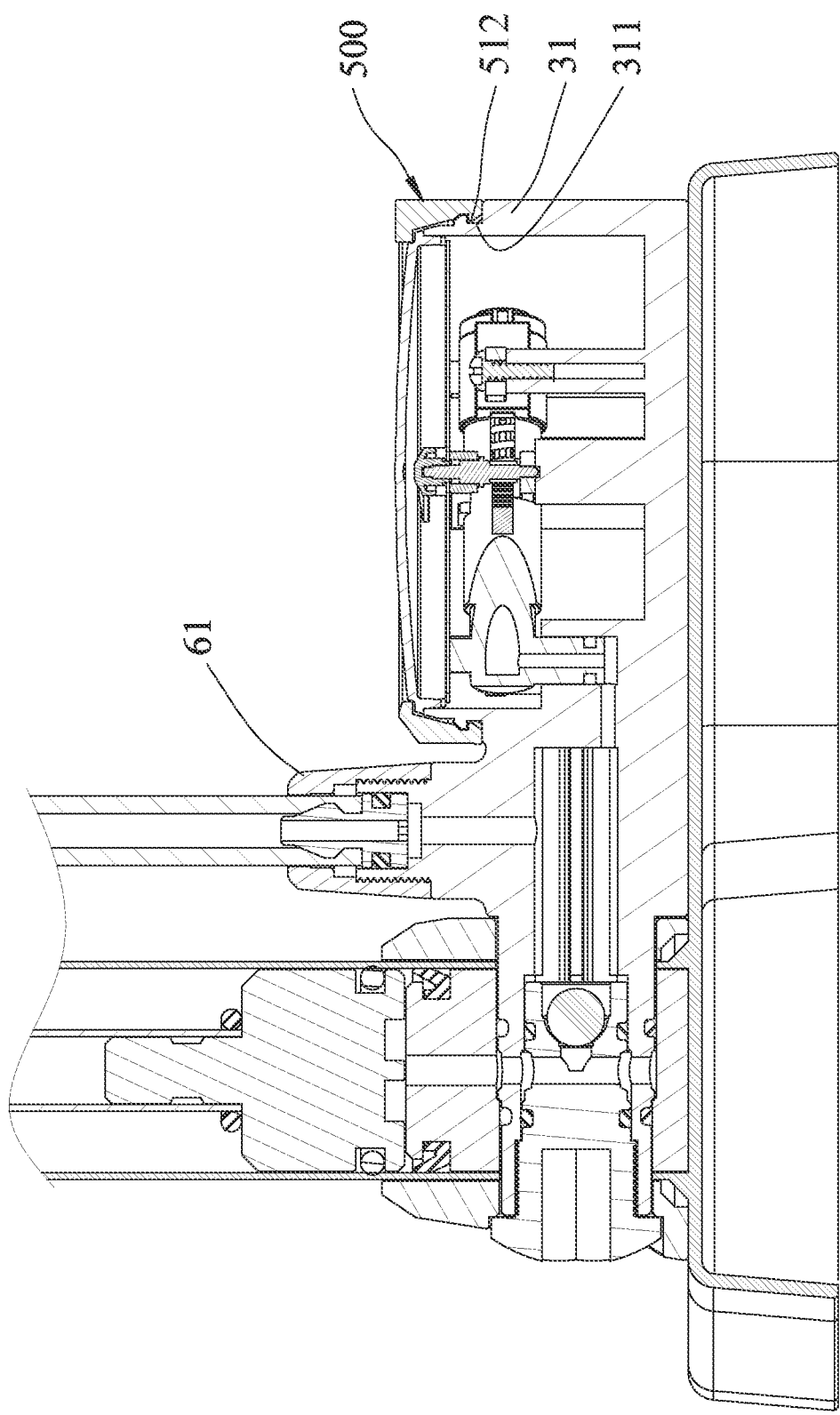
FIG. 5 is a modified example of the first embodiment.
Figure 6:
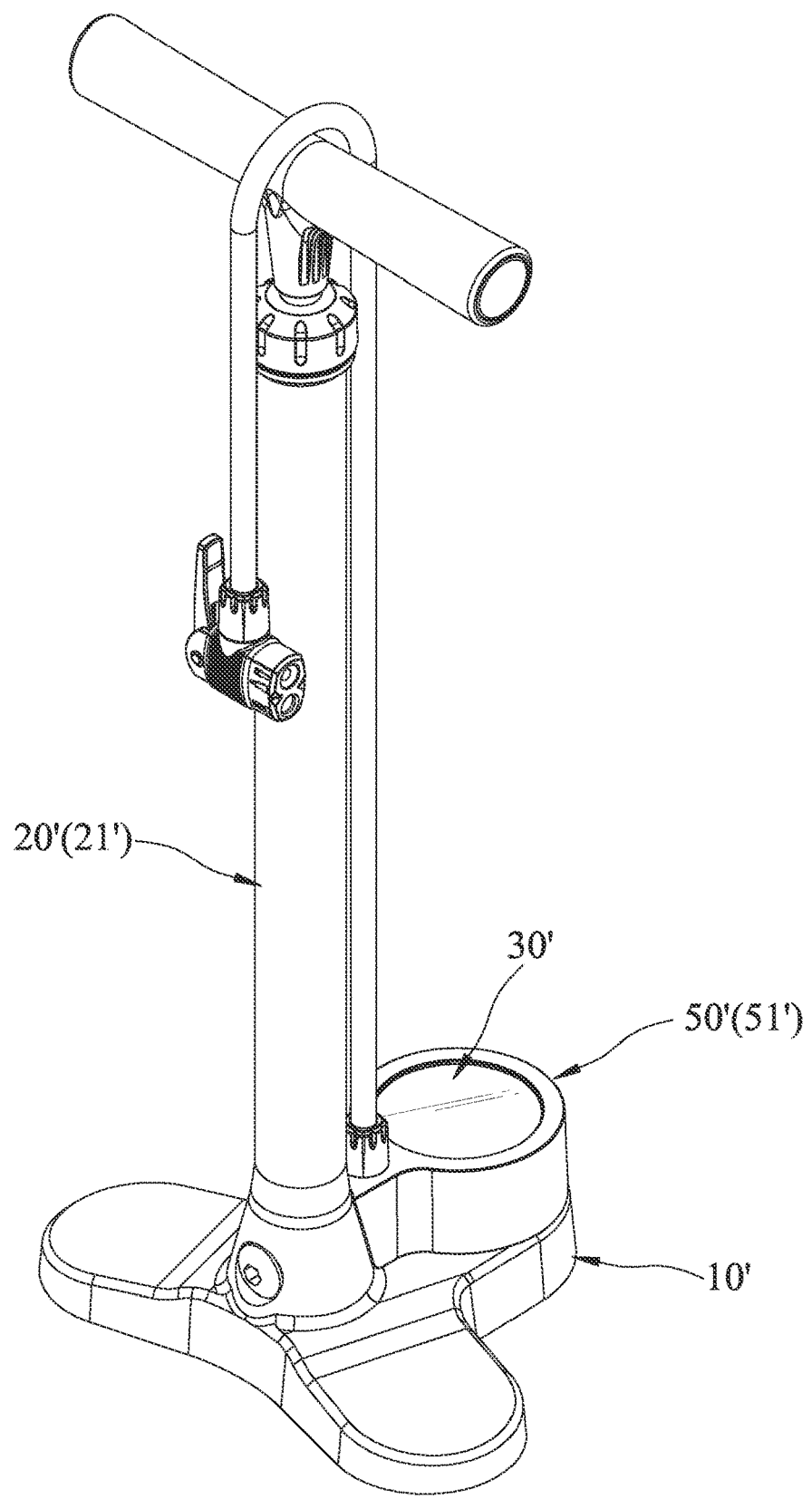
FIG. 6 is a perspective view of a second embodiment of the easy-to-assemble floor pump of the invention.
Figure 7:
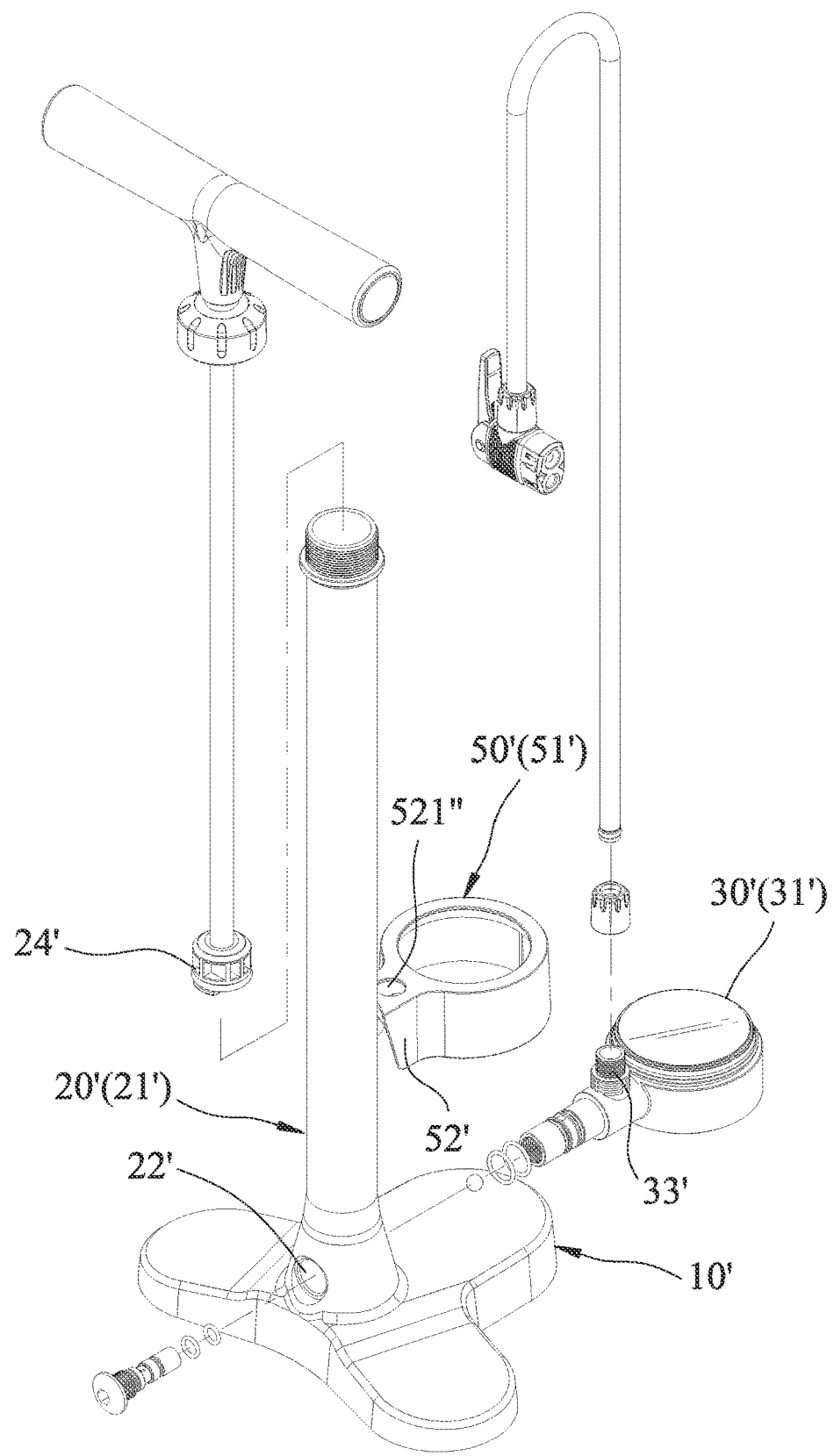
FIG. 7 is a perspective exploded view of the second embodiment.
Figure 8:
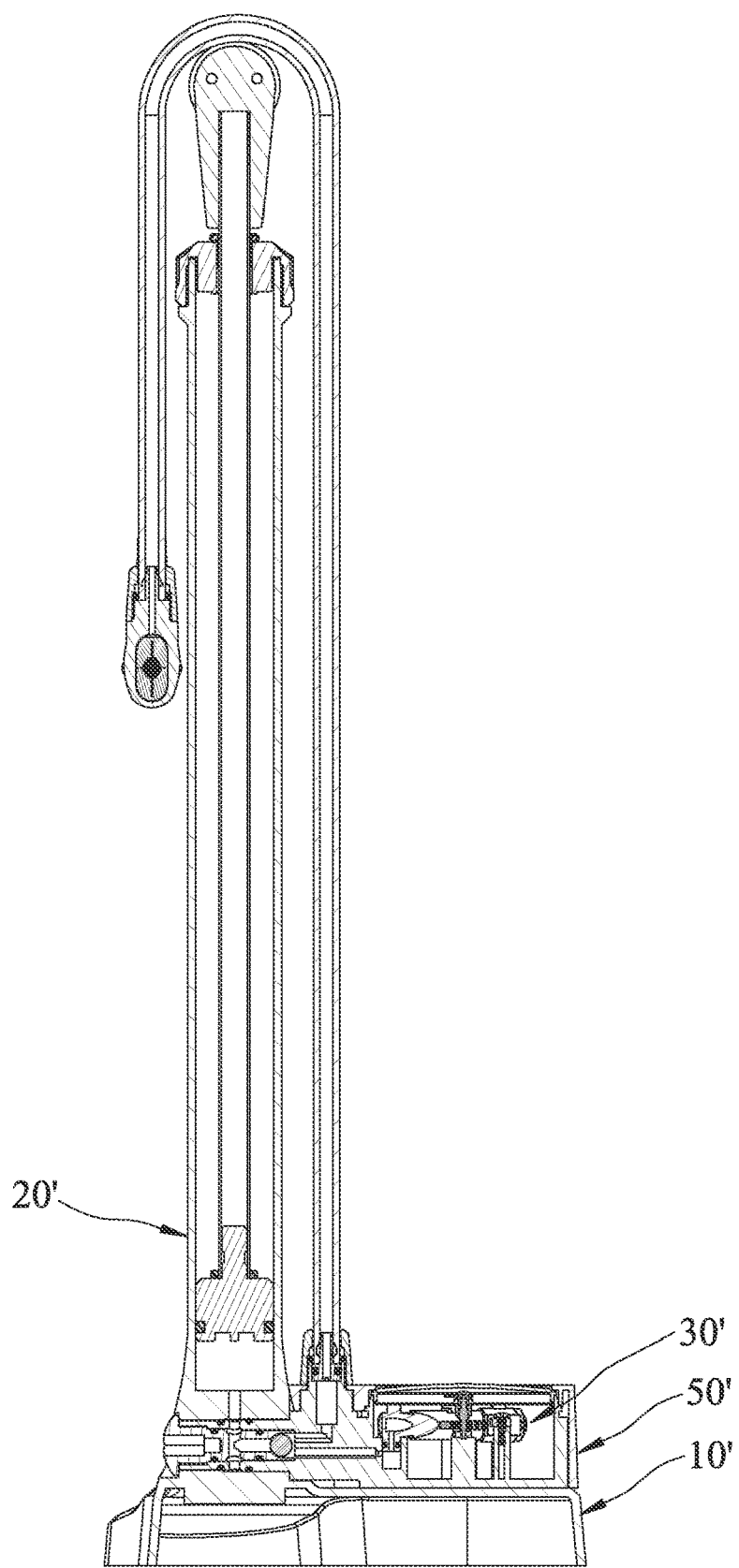
FIG. 8 is a cross-sectional view of the second embodiment.
Figure 9:
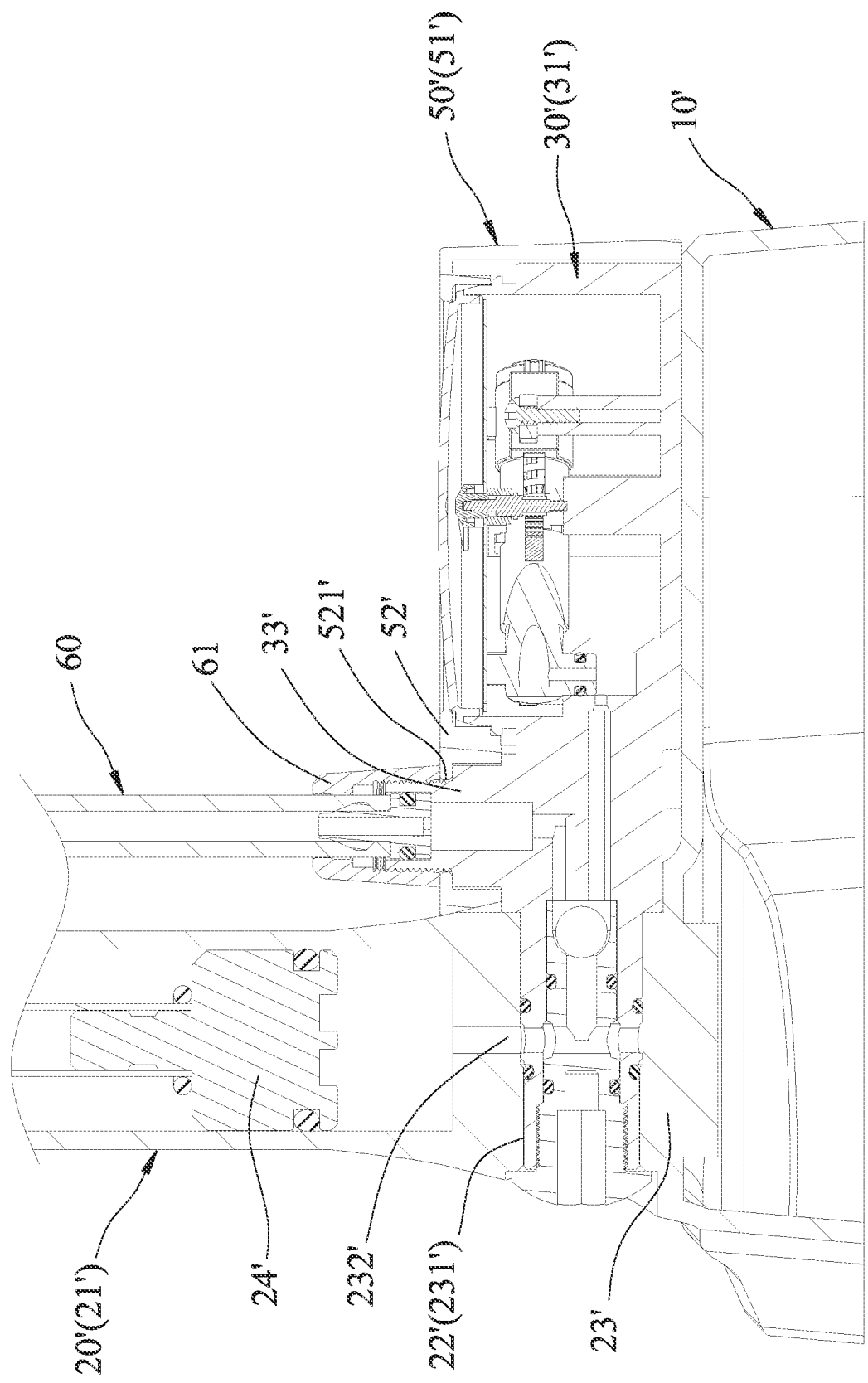
FIG. 9 is a partially enlarged view of FIG. 8.

Please refer to FIG. 5 for a modified example of the first embodiment, differences between the modified example and the first embodiment lie in: a pressure gauge cover 500 is only covered on the head part 31, and the pressure gauge cover 500 is not limited by the joint 61. Moreover, the head part 31 has a locking groove 311, and the pressure gauge cover 500 has a hook part 512 capable of fastening in the locking groove 311.

Please refer to FIG. 6 to FIG. 9, a second embodiment of the easy-to-assemble floor pump of the invention is similar to the first embodiment, a cylinder unit 20' has a cylinder body 21', a through hole 22', a non-return seat 23', and a piston 24', the non-return seat 23' of the cylinder unit 20' is connected with the cylinder body 21' and a base 10' as a whole, and the non-return seat 23' has a perforation 231' and an air guide hole 232'. In this embodiment, the perforation 231' and the through hole 22' are substantially integrated into one hole. A pressure gauge cover 50' has a main cover part 51' and an extension part 52', the main cover part 51' is sleeved on a head part 31' of a pressure gauge 30', and the extension part 52' only has a first sleeve hole 521' sleeved on an air outlet part 33'. The second embodiment is also capable of achieving roughly the same objects and efficacies as the first embodiment, that is, by using the pressure gauge cover 50' for positioning the air outlet part 33', an efficacy of the joint 61 of the air guide unit 60 and a hose connected to the joint 61 can not be shaken easily can be achieved.

Figure 10:
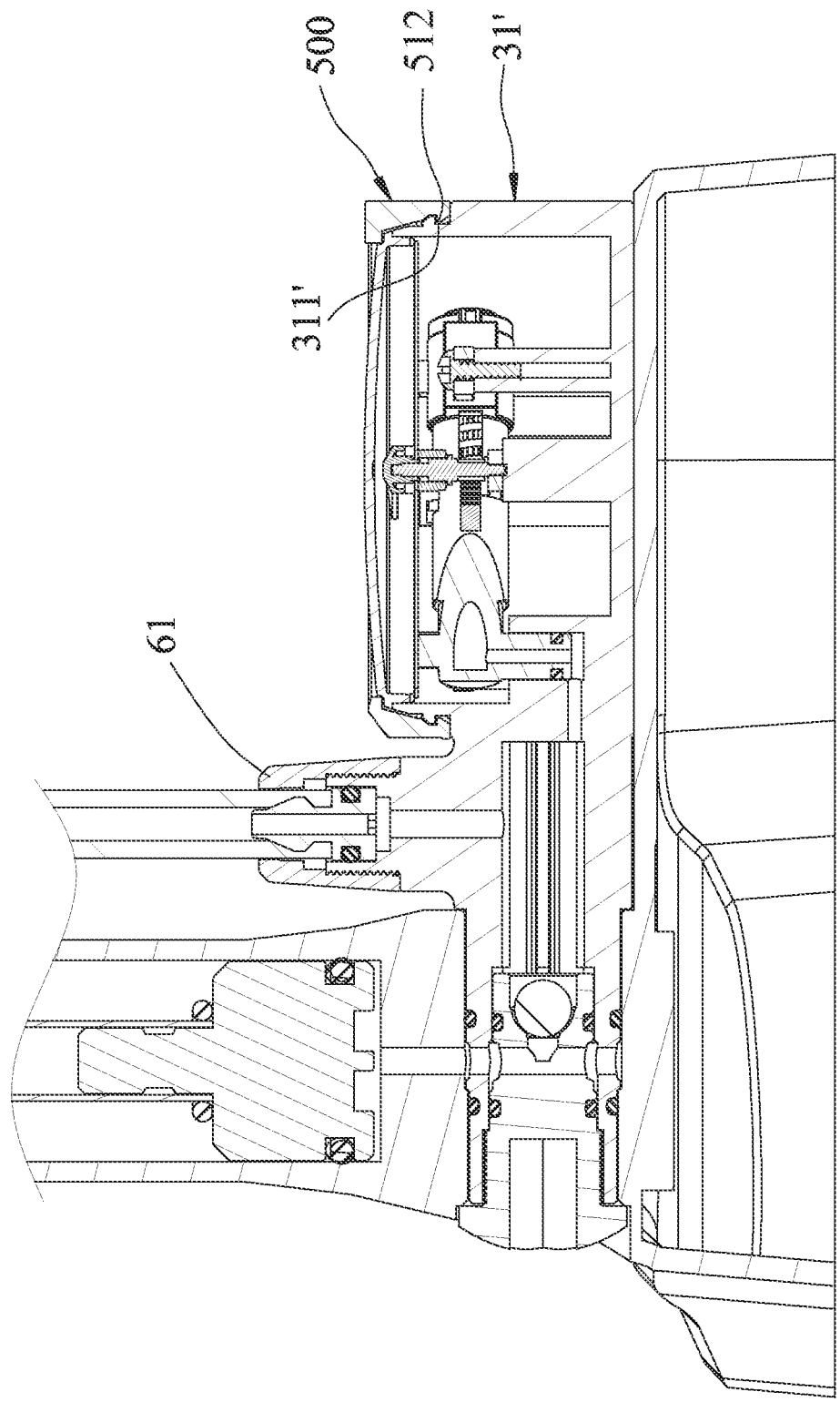
FIG. 10 is a modified example of the second embodiment.
Figure 11:
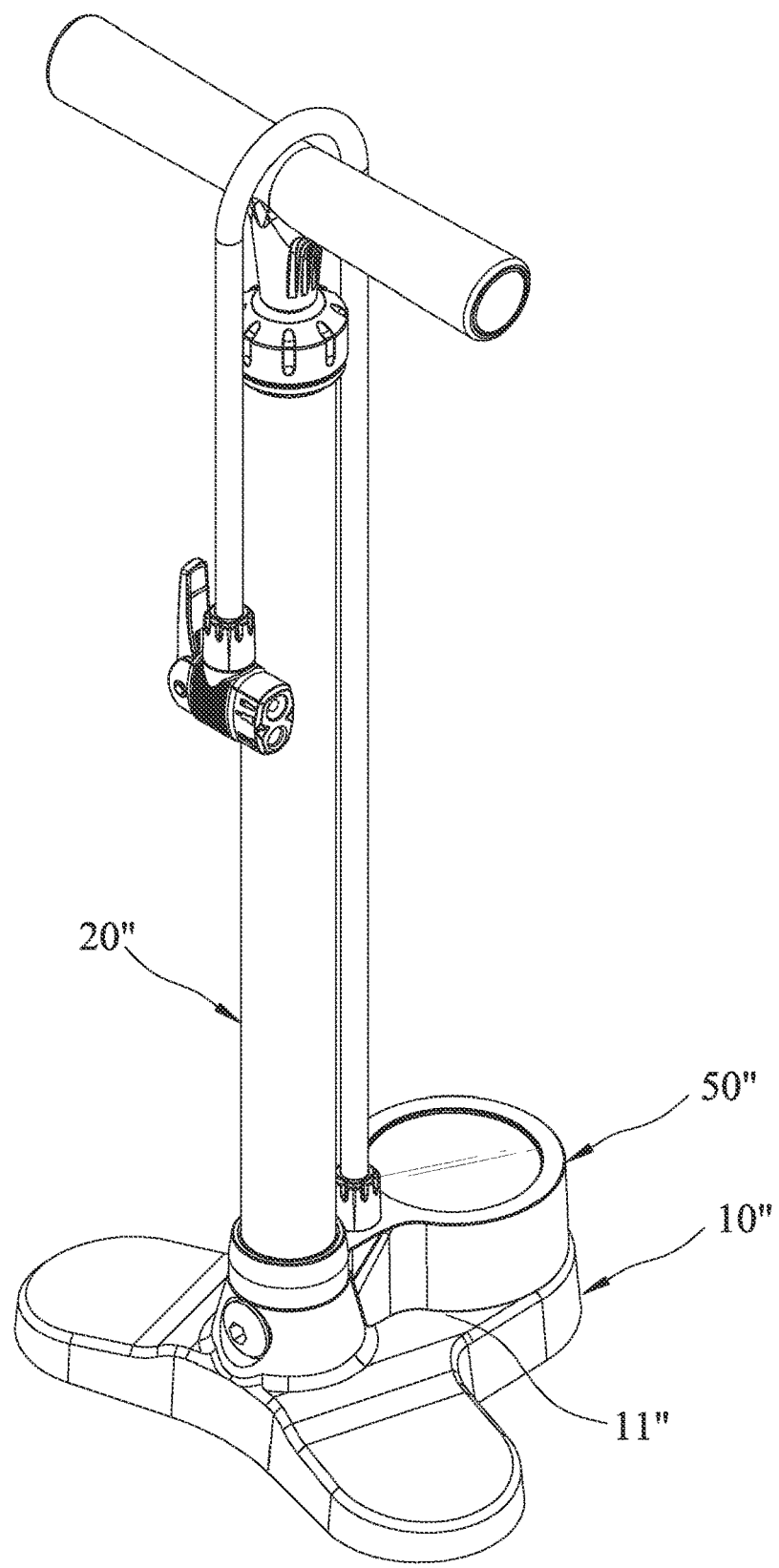
FIG. 11 is a perspective view of a third embodiment of the easy-to-assemble floor pump of the invention.
Figure 12:
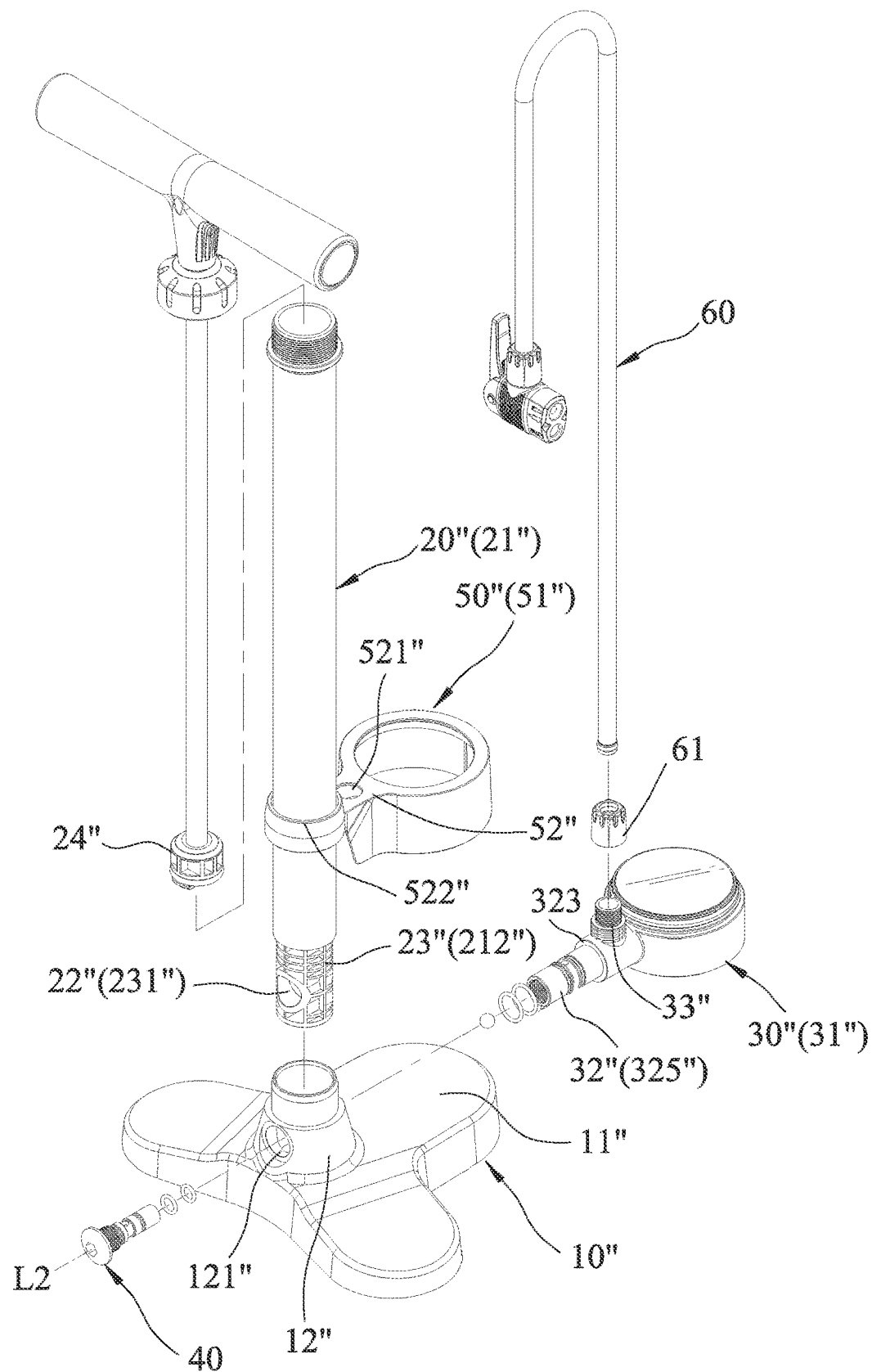
FIG. 12 is a perspective exploded view of the third embodiment.
Figure 13:
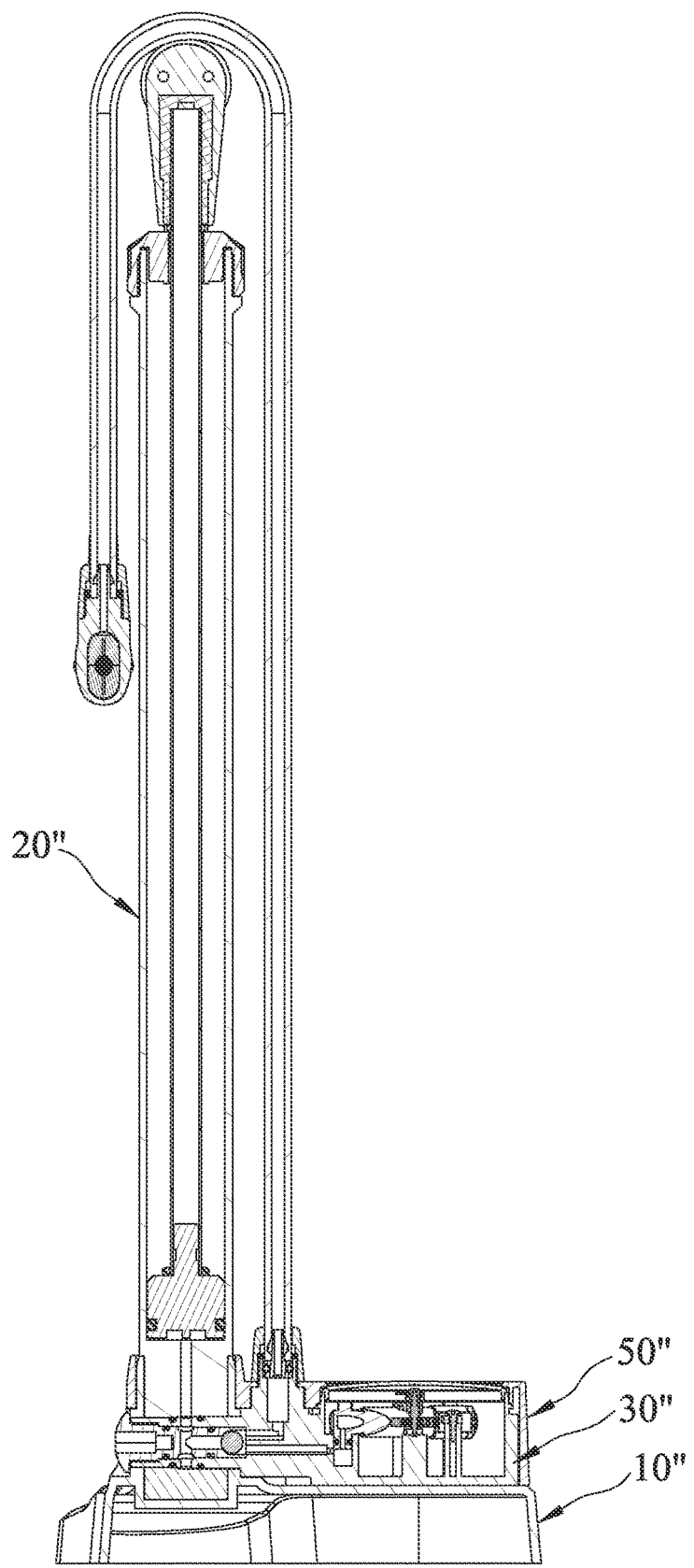
FIG. 13 is a cross-sectional view of the third embodiment.
Figure 14:
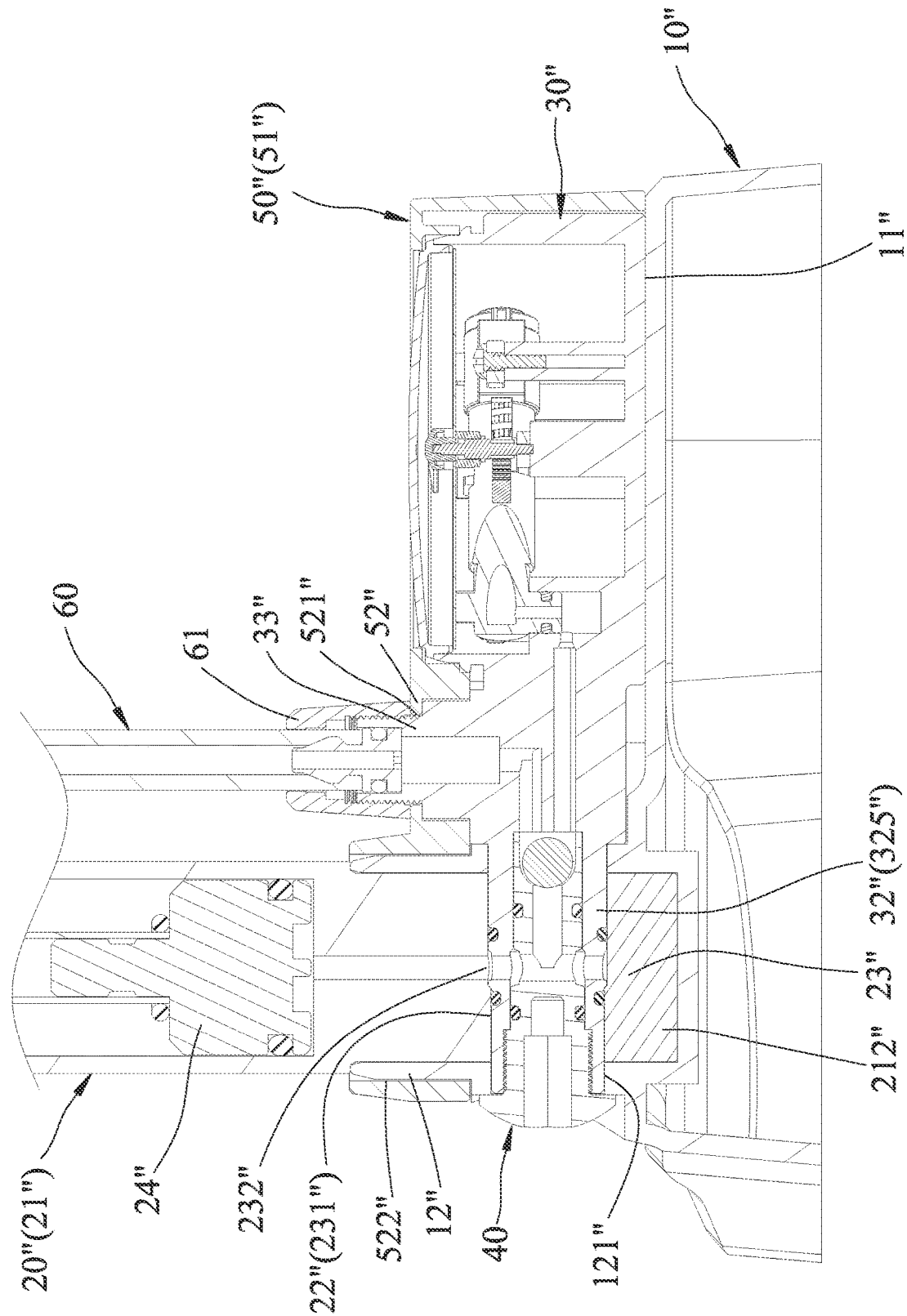
FIG. 14 is a partially enlarged view of FIG. 13.

Please refer to FIG. 10 for a modified example of the second embodiment, differences between the modified example and the second embodiment lie in: the pressure gauge cover 500 is only covered on the head part 31', and the pressure gauge cover 500 is not limited by the joint 61. Moreover, the head part 31' has a locking groove 311', and the pressure gauge cover 500 has the hook part 512 capable of fastening in the locking groove 311'.

Please refer to FIG. 11 to FIG. 14 for a third embodiment of the easy-to-assemble floor pump of the invention.

A base 10" comprises a top surface 11" and a mounting seat 12" protruding from the top surface 11", the mounting seat 12" has a transverse hole 121" disposed along the second axis L2, and the non-return valve cover 40 is abutted and limited against the mounting seat 12".

A cylinder unit 20" has a cylinder body 21", a through hole 22", a non-return seat 23", and a piston 24". The non-return seat 23" of the cylinder unit 20" and a second end 212" of the cylinder body 21" are connected as a whole, and the cylinder body 21" is detachably installed in the mounting seat 12". The non-return seat 23" has a perforation 231" and an air guide hole 232", in this embodiment, the perforation 231" and the through hole 22" are substantially integrated into one hole; the second end 212" of the cylinder body 21" and the non-return seat 23" are installed in the mounting seat 12", the transverse hole 121", the perforation 231" and the through hole 22" are coaxially disposed and communicate with one another.

A rear section (a small diameter portion 325") of a manifold part 32" of a pressure gauge 30" passes through the through hole 22" (the perforation 231") and the transverse hole 121". The non-return valve seat 40 is screwed and connected to the manifold part 32".

A pressure gauge cover 50" has a main cover part 51" and an extension part 52". The main cover part 51" is sleeved on a head part 31" of the pressure gauge 30". The extension part 52" has a first sleeve hole 521" and a second sleeve hole 522", the first sleeve hole 521" enables an air outlet part 33" to protrude, and the second sleeve hole 522" enables the cylinder body 21" to protrude. The third embodiment is also capable of achieving roughly the same objects and efficacies as the above-mentioned embodiments, and has following efficacies:

1. The non-return valve cover 40 is abutted and limited against the mounting seat 12", and the pressure gauge cover 50" is provided for positioning the cylinder body 21", the manifold part 32", and the air outlet part 33", thereby capable of preventing the pressure gauge 30" from ejecting and detaching by the air pressure when the piston 24" is reciprocating to output air pressure.
2. The joint 61 of the air guide unit 60 and a hose connected to the joint 61 can not be shaken easily.

Figure 15:
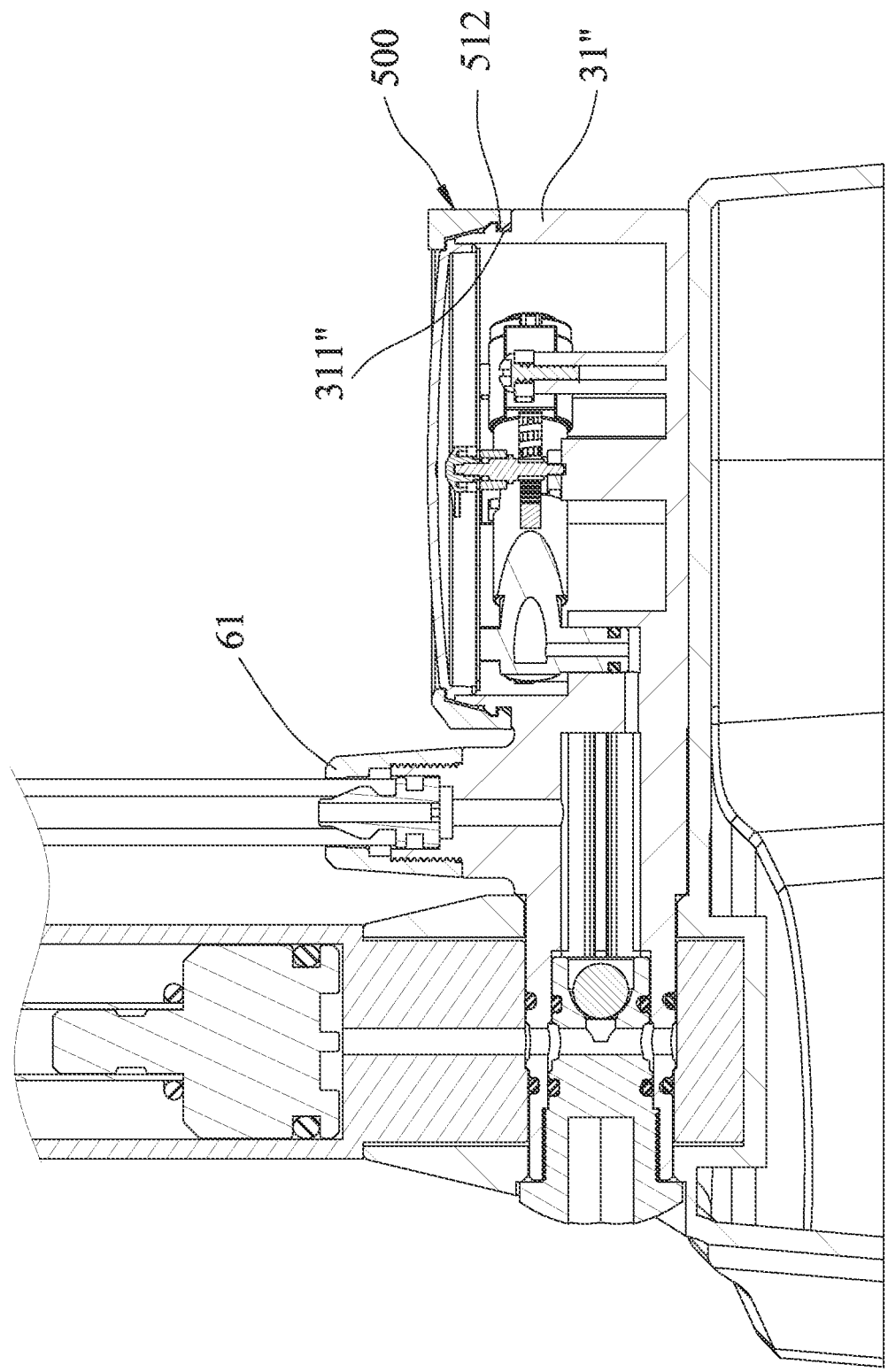
FIG. 15 is a modified example of the third embodiment.
Figure 16:
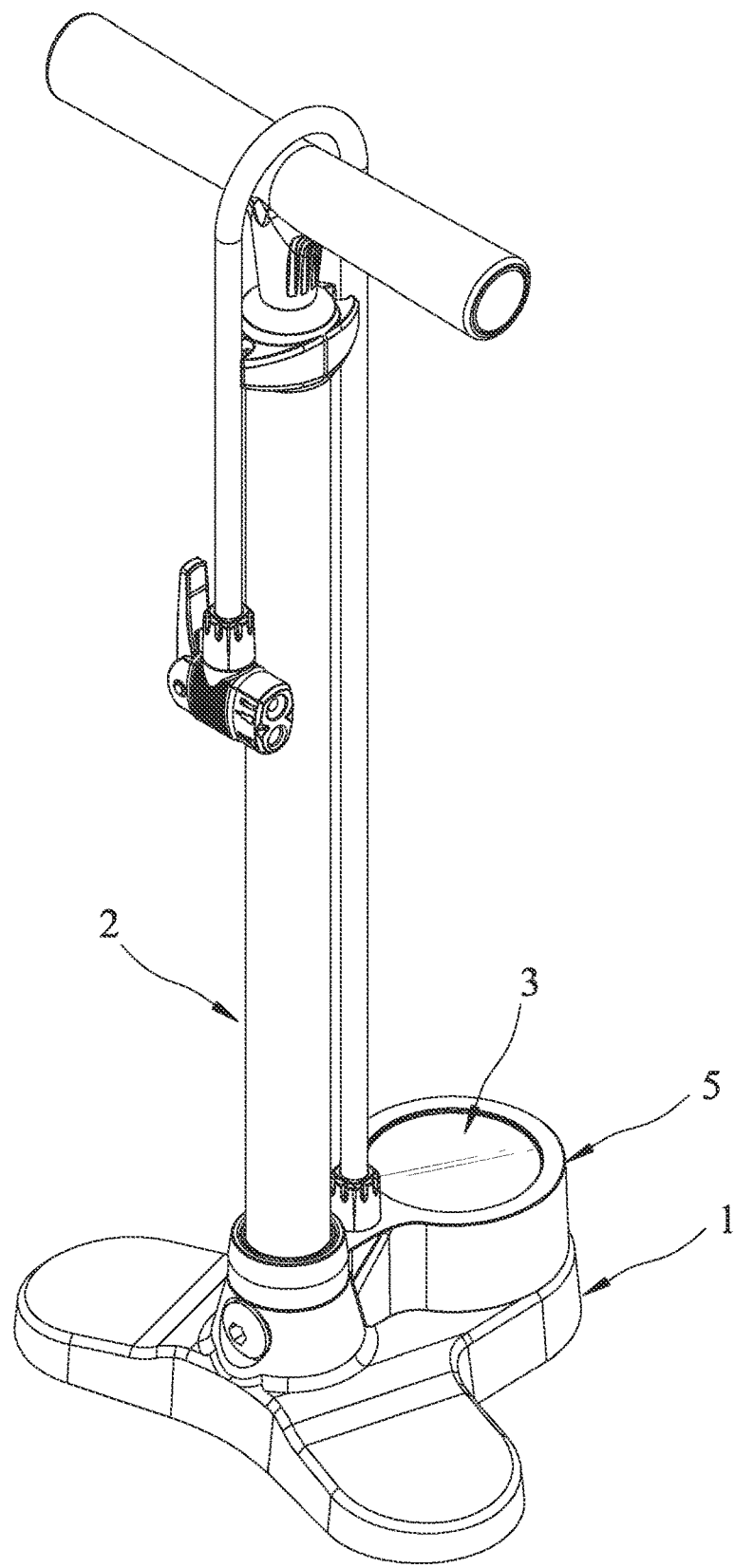
FIG. 16 is a perspective exploded view of a fourth embodiment of the easy-to-assemble floor pump of the invention.
Figure 17:
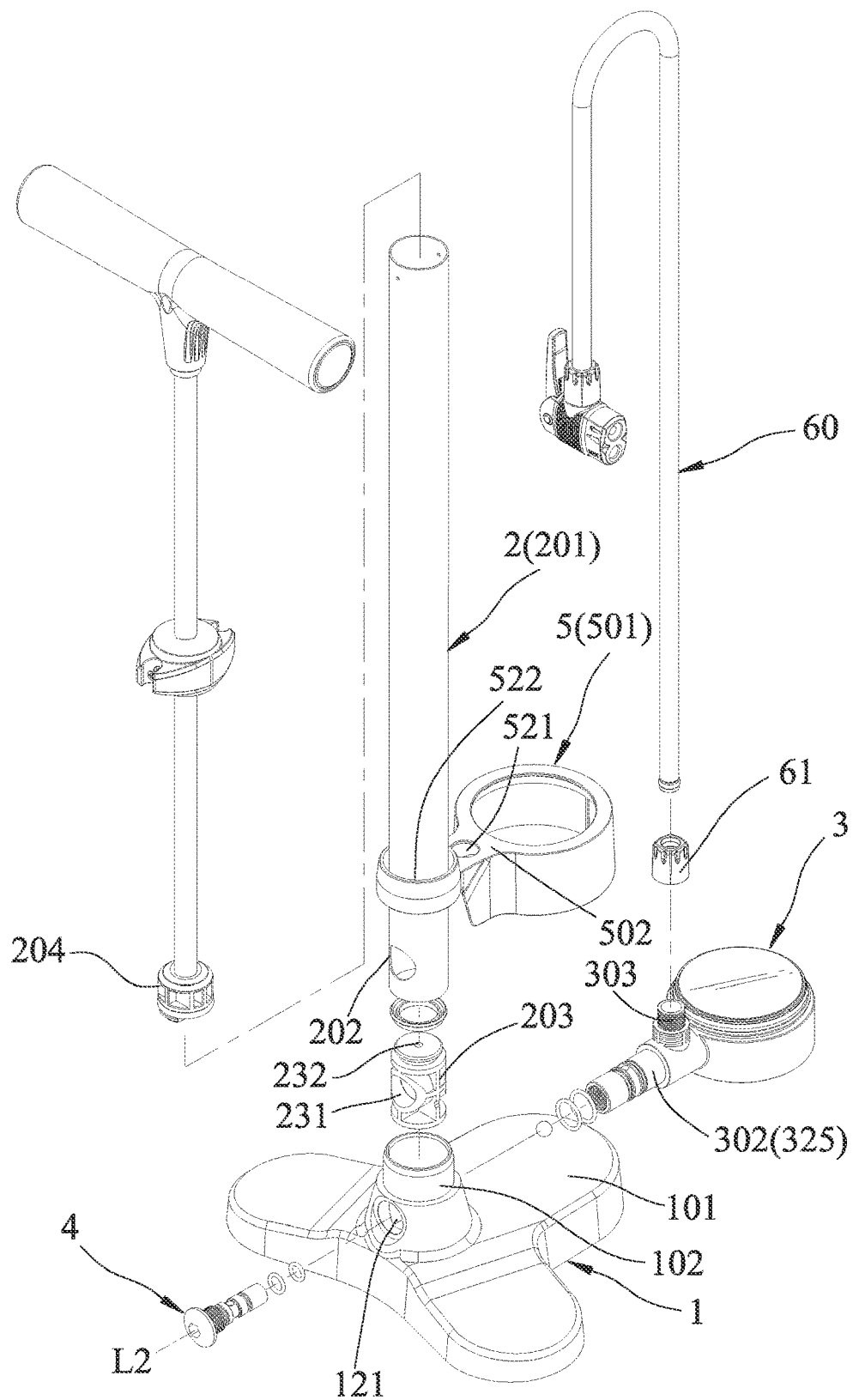
FIG. 17 is a perspective exploded view of the fourth embodiment.
Figure 18:
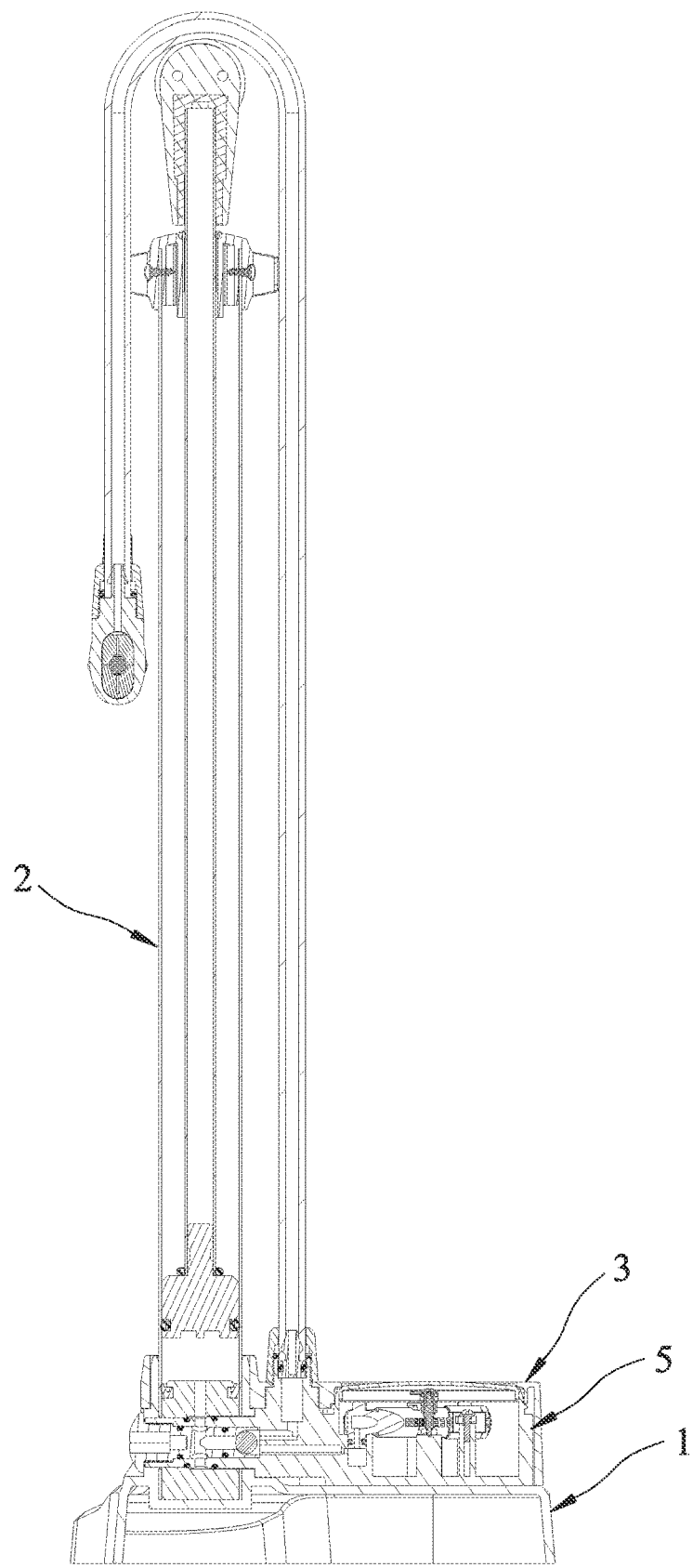
FIG. 18 is a cross-sectional view of the fourth embodiment.
Figure 19:
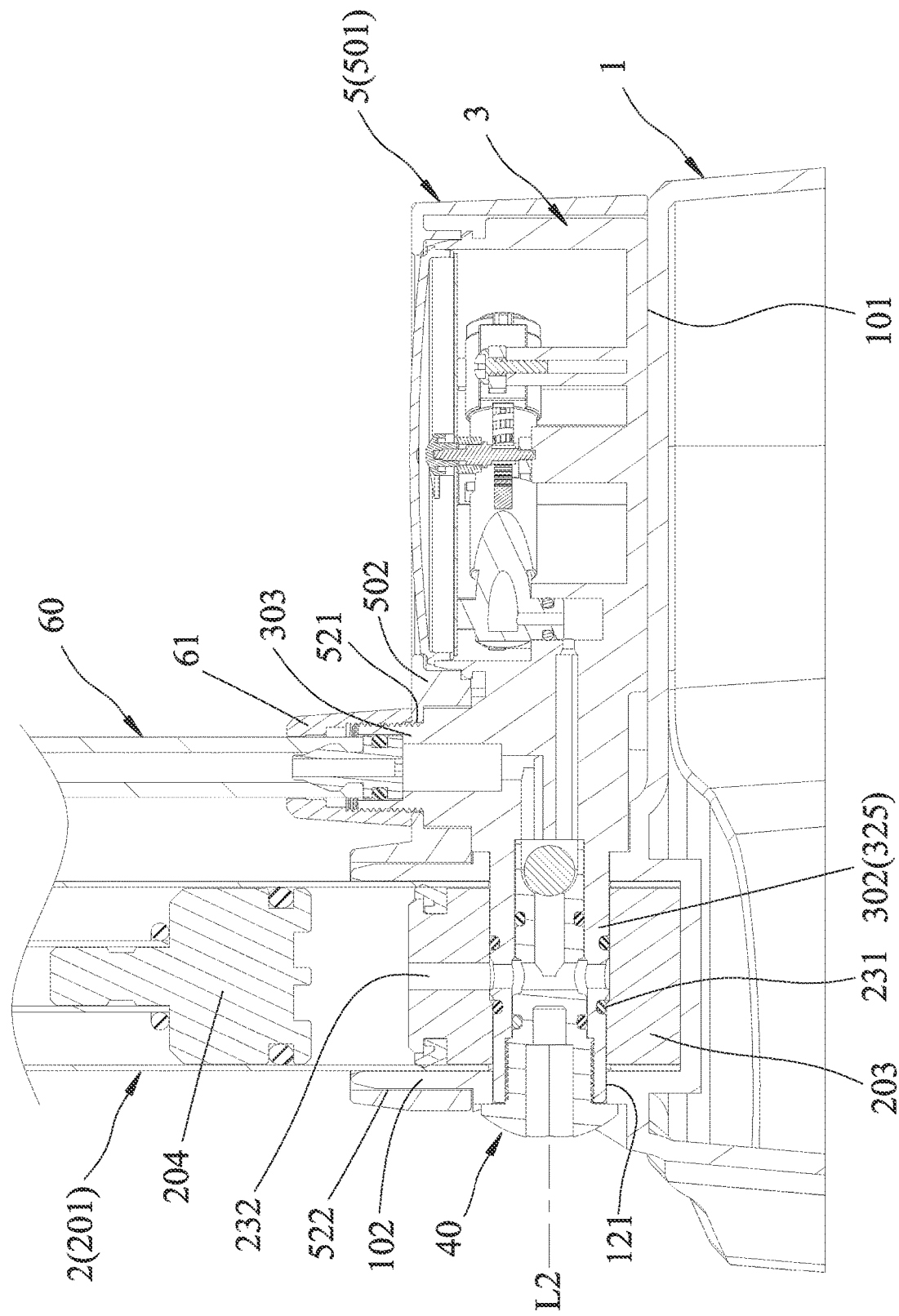
FIG. 19 is a partially enlarged view of FIG. 18.

Please refer to FIG. 15 for a modified example of the third embodiment, differences between the modified example and the third embodiment lie in: the pressure gauge cover 500 is only covered on the head part 31", and the pressure gauge cover 500 is not limited by the joint 61. Moreover, the head part 31" has a locking groove 311", and the pressure gauge cover 500 has the hook part 512 capable of fastening in the locking groove 311".

Please refer to FIG. 16 to FIG. 19 for a fourth embodiment of the easy-to-assemble floor pump of the invention.

A base 1 comprises a top surface 101 and a mounting seat 102 protruding from the top surface 101, the mounting seat 102 has a transverse hole 121 disposed along the second axis L2, and the non-return valve cover 40 is abutted and limited against the mounting seat 102.

A cylinder unit 2 has a cylinder body 201, a through hole 202, a non-return seat 203, and a piston 204, the cylinder body 201 is detachably installed in the mounting seat 102, and the non-return seat 203 is detachably installed in the cylinder body 201. The non-return seat 203 has a perforation 231 and an air guide hole 232, in this embodiment, the perforation 231, the through hole 202 and the transverse hole 121 are disposed along the second axis L2. A second end of the cylinder body 201 and the non-return seat 203 are installed in the mounting seat 102, and the transverse hole 121, the perforation 231 and the through hole 202 are disposed coaxially and communicate with one another.

A rear section (the small diameter portion 325) of a manifold part 302 of a pressure gauge 3 passes through the transverse hole 121, the through hole 202, and the perforation 231. The non-return valve seat 40 is screwed and connected to the manifold part 302.

A pressure gauge cover 5 has a main cover part 501 and an extension part 502. The main cover part 501 is sleeved on a head part 301 of the pressure gauge 3. The extension part 502 has a first sleeve hole 521 and a second sleeve hole 522, the first sleeve hole 521 enables an air outlet part 303 to protrude, and the second sleeve hole 522 is sleeved on the cylinder body 201. The fourth embodiment is also capable of achieving roughly the same objects and efficacies as the above-mentioned embodiments, and has following efficacies:

1. The non-return valve cover 40 is abutted and limited against the mounting seat 102, and the pressure gauge cover 5 is provided for positioning the cylinder body 201, the manifold part 302, and the air outlet part 303, thereby capable of preventing the pressure gauge 3 from ejecting and detaching by the air pressure when the piston 204 is reciprocating to output air pressure.
2. The joint 61 of the air guide unit 60 and a hose connected to the joint 61 can not be shaken easily.

Figure 20:
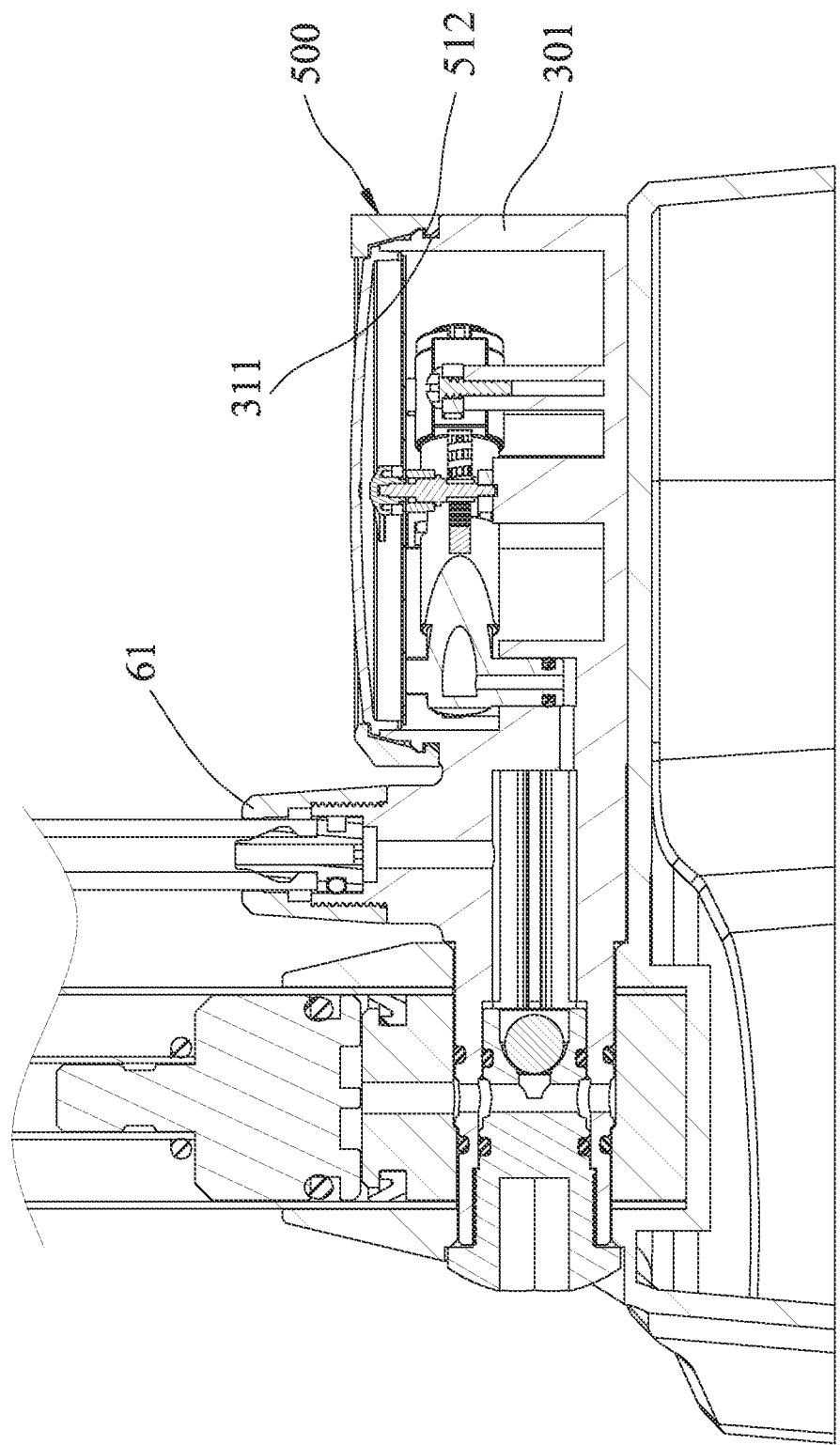
FIG. 20 is a modified example of the fourth embodiment.

Please refer to FIG. 20 for a modified example of the fourth embodiment, differences between the modified example and the fourth embodiment lie in: the pressure gauge cover 500 is only covered on the head part 301, and the pressure gauge cover 500 is not limited by the joint 61. Moreover, the head part 301 has a locking groove 311, and the pressure gauge cover 500 has the hook part 512 capable of fastening in the locking groove 311.

In summary, the easy-to-assemble floor pump of the invention has a simple overall structure, is easy to manufacture and assemble, and is capable of simplifying procedures of assembling, disassembling and replacing parts, thereby reducing costs, and reliably achieving the objects of the invention.

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:
1. An easy-to-assemble floor pump comprising:
   a base;
   a cylinder unit installed on the base in a hollow tubular shape along a first axis, the cylinder unit having a cylinder body, the cylinder body having a first end and a second end, and forming a first flow channel inside; a through hole formed along a second axis and penetrating through the second end of the cylinder body; a non-return seat disposed at the second end of the cylinder body, the non-return seat having a perforation, the perforation communicating with the through hole, the perforation and the through hole being located outside the base; and a piston installed in the cylinder body and capable of reciprocating;
   a pressure gauge installed at the second end of the cylinder body along the second axis, the pressure gauge having a head part and a manifold part, the manifold part having a second flow channel formed inside, and an air outlet part disposed on the manifold part and forming a third flow channel inside; the manifold part passing through the through hole and the perforation and being installed in the non-return seat, the second flow channel of the manifold part and the third flow channel of the air outlet part communicating with the first flow channel; reciprocating movement of the piston causing air in the cylinder body to be capable of entering into the second flow channel and the third flow channel respectively through the first flow channel; and
   a non-return valve cover having a first vent hole and a diversion channel communicating with each other, the non-return valve cover connecting to the manifold part of the pressure gauge; the first vent hole communicating with the first flow channel; and the diversion channel communicating with the second flow channel and the third flow channel.

2. The floor pump as claimed in claim 1, wherein the manifold part has a front section and a rear section, the air outlet part is disposed on an outer peripheral surface of the front section; the rear section has a second vent hole, the rear section passes through the through hole and the perforation and connects to the non-return valve cover; and the second vent hole communicates with the first vent hole.

3. The floor pump as claimed in claim 1, wherein the head part and the manifold part of the pressure gauge are integrally formed.

4. The floor pump as claimed in claim 2, wherein the first vent hole and the second vent hole are located on a same axis.

5. The floor pump as claimed in claim 1, wherein the third flow channel is vertical.

6. The floor pump as claimed in claim 1, further comprising a pressure gauge cover with a main cover part and an extension part, the main cover part being sleeved on the head part of the pressure gauge and having a display hole, the extension part extending from the main cover part and having a first sleeve hole enabling the air outlet part to protrude.

7. The floor pump as claimed in claim 6, wherein the extension part has a second sleeve hole enabling the cylinder body to protrude.

8. The floor pump as claimed in claim 1, further comprising a pressure gauge cover with a main cover part and an extension part, the main cover part being sleeved on the head part of the pressure gauge and having a display hole, the extension part extending from the main cover part and having a third sleeve hole enabling the non-return valve cover to protrude.

9. The floor pump as claimed in claim 1, wherein the non-return seat is integrally formed at the second end of the cylinder body.

10. The floor pump as claimed in claim 1, wherein the cylinder body of the cylinder unit is connected with the base as a whole.

11. The floor pump as claimed in claim 1, wherein the base comprises a top surface and a mounting seat protruding from the top surface, the mounting seat has a transverse hole disposed along the second axis; the second end of the cylinder body and the non-return seat are installed in the mounting seat, the transverse hole, the through hole and the perforation are coaxially disposed and communicate with one another; and the manifold part is inserted into the transverse hole, the through hole, and the perforation.

12. The floor pump as claimed in claim 6, wherein the base comprises a top surface and a mounting seat protruding from the top surface, the mounting seat has a transverse hole disposed along the second axis; the second end of the cylinder body and the non-return seat are installed in the mounting seat, the transverse hole, the through hole and the perforation are coaxially disposed and communicate with one another; and the manifold part is inserted into the transverse hole, the through hole, and the perforation.

13. The floor pump as claimed in claim 7, wherein the base comprises a top surface and a mounting seat protruding from the top surface, the mounting seat has a transverse hole disposed along the second axis; the second end of the cylinder body and the non-return seat are installed in the mounting seat, the transverse hole, the through hole and the perforation are coaxially disposed and communicate with one another; and the manifold part is inserted into the transverse hole, the through hole, and the perforation.

14. The floor pump as claimed in claim 11, further comprising a non-return valve cover having a first vent hole and a diversion channel communicating with each other, the non-return valve cover connecting to the manifold part of the pressure gauge; the first vent hole communicating with the first flow channel; and the diversion channel communicating with the second flow channel and the third flow channel.

15. The floor pump as claimed in claim 12, further comprising a non-return valve cover having a first vent hole and a diversion channel communicating with each other, the non-return valve cover connecting to the manifold part of the pressure gauge; the first vent hole communicating with the first flow channel; and the diversion channel communicating with the second flow channel and the third flow channel.

16. The floor pump as claimed in claim 13, further comprising a non-return valve cover having a first vent hole and a diversion channel communicating with each other, the non-return valve cover connecting to the manifold part of the pressure gauge; the first vent hole communicating with the first flow channel; and the diversion channel communicating with the second flow channel and the third flow channel.

17. The floor pump as claimed in claim 1, wherein one end of the diversion channel communicates with the second flow channel and the third flow channel at the same time.

18. The floor pump as claimed in claim 1, wherein the head part of the pressure gauge has a locking groove, the floor pump further comprises a pressure gauge cover, and the pressure gauge cover has a hook part capable of fastening in the locking groove.

\* \* \* \* \*